April 13, 1926.

C. LE G. FORTESCUE 1,580,477

REACTION SYNCHRONOUS MOTOR

Filed Jan. 5, 1923

WITNESSES:
JR Myers
S M Pineles

INVENTOR
Charles Le G. Fortescue
BY
Wesley G. Carr
ATTORNEY

Patented Apr. 13, 1926.

1,580,477

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

REACTION SYNCHRONOUS MOTOR.

Application filed January 5, 1923. Serial No. 610,777.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Reaction Synchronous Motors, of which the following is a specification.

My invention relates to synchronous motors of the reaction type and it has for its object to provide a self-starting synchronous motor capable of developing a higher torque at synchronous speed than those known heretofore.

Another object of my invention is to provide a structure comprising magnetically active parts having paths of high and low reluctance in electrical quadrature to each other.

A further object of my invention is to provide a synchronous reaction motor having a secondary member wherein magnetic materials are combined with non-magnetic materials into a strong and non-polar structure and which acquires, in a rotating magnetic field, a magnetic polarity similar to a salient-pole construction.

Figures 1, 2:
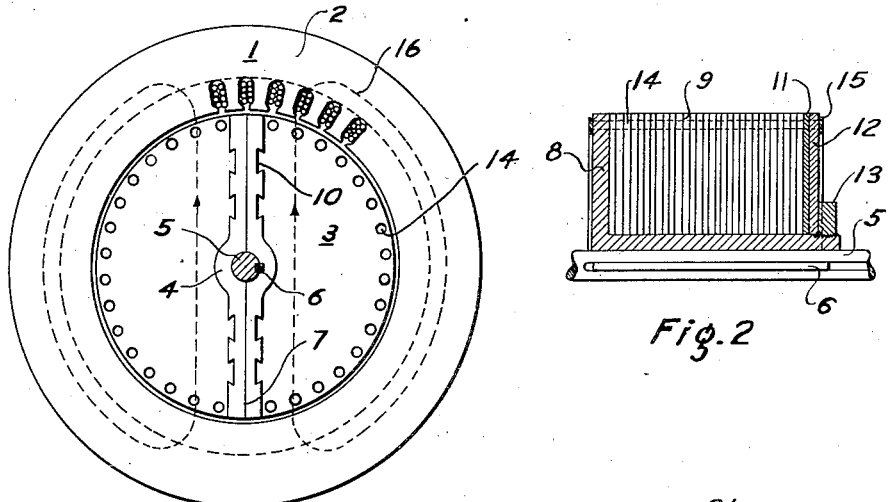
Figures 3, 4:
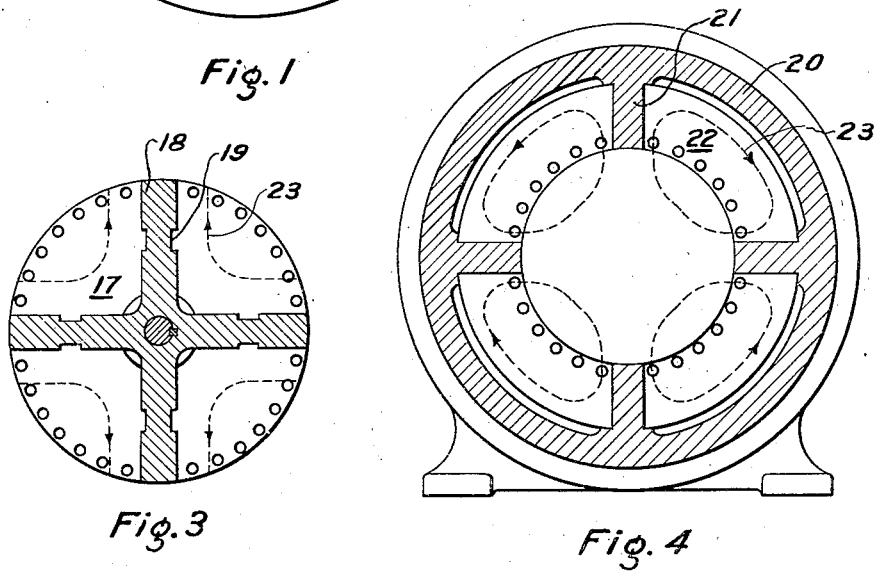

In the accompanying drawings,

Figure 1 is a vertical transverse section of a two-pole synchronous reaction motor embodying my invention, Fig. 2 is a longitudinal sectional view of a portion of the rotor member, Fig. 3 is a vertical transverse section of the rotor of a four-pole rotor embodying my invention, and Fig. 4 is a similar view of a four-pole motor embodying my invention in its stator member.

In Fig. 1 is shown a stator 1 provided with a suitable winding 2 which produces a two-pole rotating magnetic field, as in the usual induction motor. The rotor 3 consists of a supporting member, or spider 4 of non-magnetic material such as brass, secured to a shaft 5 by means of a key 6, and comprises two laterally extending plates 7, 7, joined at one end by a flange 8. Segmental laminæ 9 are assembled on both sides of the plates 7 and are dove-tailed to the plates 7, as indicated at 10. The assembled parts are pressed together and secured upon the spider by means of segmental end plates 11, 11, an end ring 12 and a nut 13, which is in threaded engagement with the end of the spider. Copper bars 14 are provided along the periphery of the rotor and are electrically connected at the ends by rings 15, 15 to provide a squirrel-cage winding of the usual type. A rotor assembled in such manner has low reluctance in the direction of the non-magnetic spider members 7, 7, as indicated by the dotted lines 16, and high reluctance at right angles thereto.

Synchronous motors of the reaction type are based upon the general property of electromagnetic circuits that they oppose any decrease of the stored magnetic energy of the system. A rotor having a low reluctance in one direction and a high reluctance in quadrature thereto will, therefore, move in such manner that the stored magnetic energy of the system will be a maximum. Thus, in the case of a rotating magnetic field, the rotor will rotate synchronously with said field and with the alternating current supplying the stator winding. The torque which may thus be exerted by the rotor is directly dependent upon the rate at which the reluctance of the magnetic flux changes with the angle between the diameter of minimum reluctance in the secondary member and the direction of the flux.

The rotor member of a reaction synchronous motor has heretofore been made of magnetizable materials and has been provided with salient poles in the direction of minimum reluctance. According to my invention, the paths of minimum reluctance are provided, in a smooth-core rotor in the direction of the field flux, and paths of very high reluctance are provided in the direction in quadrature thereto by assembling the magnetizable sheets 9 between the magnetically inactive plates 7.

The rotor is started, in the usual way, as an induction motor and, as a result of the particular construction described, the rotor is pulled very quickly into synchronism. I have found that a motor embodying my invention gives a large torque at synchronous speed and has a strong tendency to remain in synchronism.

My invention may also be employed in multiple-pole motors, as shown in Fig. 3, wherein a four-pole rotor is illustrated. This rotor consists of segmental sheets 17 of magnetic material assembled in planes perpendicular to the axis of the rotor between the four arms of a non-magnetizable spider 18, said sheets being secured to the spider by means of tongues and grooves 19.

In Fig. 4 is shown a four-pole stator embodying my invention and comprising a frame 20 of non-magnetizable material having inwardly directed longitudinal ribs or plates 21 of the same material and segmental laminations or sheets 22 of magnetizable material assembled between the plates, the other parts of the construction being substantially the same as in a usual squirrel-cage stator. In operation, the secondary core of either Fig. 3 or Fig. 4 will have the effect of salient poles with low magnetic reluctance in the directions of the non-magnetic plates 18 and 21, as indicated by the arrows 23, and a higher reluctance transversely thereof or in electrical quadrature thereto.

While I have described my invention with respect to synchronous reaction motors, it is equally applicable to other forms of dynamo-electric machines wherein a difference in the reluctance of the magnetic circuit along certain desired paths is important. It will be evident that various minor changes in the embodiment of my invention may be resorted to by those skilled in the art and it is my desire that the accompanying claims should cover any modifications and equivalents implied in the language thereof.

I claim as my invention:

1. In a synchronously operating dynamo-electric machine, a polar construction comprising a plurality of stacks of segmental laminations of magnetizable material, a plurality of radially and longitudinally disposed supporting plates of non-magnetizable material disposed between said stacks and keyed to the ends of the segmental laminations, and a non-magnetizable connecting member united to said non-magnetizable supporting plates and rigidly joining the same together.

2. A reaction synchronous motor having a geometrically non-polar secondary member comprising a plurality of stacks of segmental laminations of magnetizable material, a plurality of radially and longitudinally disposed supporting plates of non-magnetizable material disposed between said stacks and keyed to the ends of the segmental laminations, and a non-magnetizable connecting member united to said non-magnetizable supporting plates and rigidly joining the same together.

In testimony whereof, I have hereunto subscribed my name this 18th day of December 1922.

CHARLES LE G. FORTESCUE.